Dec. 15, 1959 R. L. CARBREY 2,917,734

CODE TRANSLATOR

Original Filed March 29, 1952

INVENTOR
R. L. CARBREY
BY Harry C. Hart
ATTORNEY

United States Patent Office 2,917,734

Patented Dec. 15, 1959

2,917,734

CODE TRANSLATOR

Robert L. Carbrey, Madison, N.J., assignor to Bell Telephone Laboratories, Incorporated, New York, N.Y., a corporation of New York

Original application March 29, 1952, Serial No. 279,479, now Patent No. 2,755,459, dated July 17, 1956. Divided and this application December 8, 1955, Serial No. 551,948

6 Claims. (Cl. 340—347)

This application is a division of an earlier application, Serial No. 279,479, filed March 29, 1952, now Patent 2,755,459, granted July 17, 1956.

This invention relates to code translation and particularly to the translation of a train of pulses representing information in one form of binary code into a different train of pulses representing the same information in another form of binary code.

Binary code representation of intelligence is now quite commonly used, for example, in digital computers and in pulse code modulation systems. In digital computers, the code groups made up of permutations of bivalued elements may represent decimal numbers. In pulse code modulation systems, the code groups customarily represent instantaneous sample amplitudes of a message wave. In systems employing pulses, the two values of the code may be represented by "On" pulses and "Off" pulses, so that it is necessary during any code element interval to determine merely whether or not a pulse is present. In other systems, such as certain digital computers, the two values of the code are reprsented by two steady voltage levels which may be both positive, both negative, or one positive and one negative. In such systems, it is necessary merely to discriminate between the two voltage levels to determine the code elements. Still other systems employ combinations of the two just mentioned.

The two values or characters of the binary code will be referred to herein as "1" and "0" in accordance with the customary parlance. Further, a code group will be referred to as a number, although it should be understood that the numbers themselves may represent any form of intelligence, such as an instantaneous message sample, the angular position of a shaft, or a decimal number. The code elements will be referred to as digits.

One form of the binary code is that which follows the binary scale of notation and which will be termed the "conventional binary code" herein. Each digit of a code group of digits in conventional binary code represents a certain component of the decimal number of amplitude represented by the code group. An advantage of this code is the ease with which it may be decoded, since the significance of the digits is parallel to the denominational order of the corresponding digits of the binary number. Decoding apparatus that utilizes this property of the conventional binary code is disclosed in A. J. Rack Patent 2,514,671, issued July 11, 1950.

Another form of binary code is described in F. Gray Patent 2,632,058, issued March 17, 1953. From the manner in which this code may be constructed, it has been termed the "reflected binary code" and is referred to herein by that name.

A tabulation of the first sixteen integral numbers in the decimal system, in the conventional binary code, and in the reflected binary code, is given below:

| Decimal Number | Conventional Binary Code | Reflected Binary Code |
|---|---|---|
| 0 | 00000 | 00000 |
| 1 | 00001 | 00001 |
| 2 | 00010 | 00011 |
| 3 | 00011 | 00010 |
| 4 | 00100 | 00110 |
| 5 | 00101 | 00111 |
| 6 | 00110 | 00101 |
| 7 | 00111 | 00100 |
| 8 | 01000 | 01100 |
| 9 | 01001 | 01101 |
| 10 | 01010 | 01111 |
| 11 | 01011 | 01110 |
| 12 | 01100 | 01010 |
| 13 | 01101 | 01011 |
| 14 | 01110 | 01001 |
| 15 | 01111 | 01000 |
| 16 | 10000 | 11000 |

It will be apparent from this tabulation how any number may be constructed in either code provided a sufficient number of digits are employed.

The reflected binary code has certain distinct advantages. One property of the code giving rise to such an advantage, as plainly appears from the foregoing table, is that the code groups or binary numbers representing successive amplitudes or decimal numbers differ in only one code element or digit. A coding error due to an ambiguity at a transition from one quantum step to the next cannot therefore exceed one quantum step, whereas a similar error in a coder employing the conventional binary code may give rise to a resulting error of many quantum steps and in an angular encoder to an error in reading as great as 180 degrees. On the other hand, the process of decoding the reflected binary code is in general more complicated than the process required for decoding numbers in the conventional binary code. This difficulty results from the fact that the elements or digits of the reflected binary code have not the same simple significance as the code elements of the conventional binary code. It is, however, possible to decode the reflected binary code numbers by a process of weighting the individual code elements, as is described in the above-mentioned Gray application. The process of addition also requires more complicated apparatus with numbers in reflected binary code than with numbers in the conventional code.

Because of the advantages offered by the reflected binary code in the coding operation and the advantages of the conventional binary code in the decoding and other operations, it is often desirable to convert from one to the other.

R. L. Carbrey Patent 2,571,680, issued October 16, 1951, describes apparatus for translating the reflected code into the conventional code when it appears as a group of simultaneous pulses, one on each of a group of conductors. The Frank Gray patent, above referred to, describes apparatus for translating from the reflected code, when it appears in the form of a train of sequential pulses, arranged in order of decreasing digital significance, into the conventional binary code. P. R. Aigrain, Patent 2,660,618, issued November 24, 1953, describes another such system.

So far as is known, no code translator has been proposed which is able to carry out the reverse operation, namely translation for conventional binary code to reflected binary code. So far as is known, furthermore, all sequential code pulse group translators heretofore proposed for translation from reflected to conventional have required that the pulses of each incoming code pulse group to be translated be arranged in the order of decreasing digital significance. Further, such translators have required to be reset to a standard or reference condition at the conclusion of each code pulse group and before the beginning of the next one. The resetting operation takes time, of the order of at least one pulse period, so that a blank pulse period must be provided between every two consecutive pulse groups to allow the resetting operation to be completed. From the standpoint of transmission economy, this reset time is wasted.

In certain situations, the order in which the pulses appear in the train is of prime importance. Thus, for example, the decoder of Rack Patent 2,514,671 requires that the conventional binary code pulse train be arranged in order of decreasing digital significance. So, too, in the performance of arithmetical operations through the agency of a digital computer, it is necessary to complete the operation called for on the cardinal numbers before the "carry" can be determined, and this consideration too, dictates that the pulses of the incoming train be arranged in order of decreasing digital significance. It is therefore the principal object of the present invention to translate from the conventional binary code to the reflected binary code, and to perform this translation on a sequential pulse train arranged in the order of decreasing digital significance or in the reverse order.

These objects are attained by the provision of a disparity recognizer (i.e., a device having two input points and an output point and generating at its output point a pulse of one kind upon the application of like pulses to its input points and a pulse of another kind on the application to its input points of unlike pulses), means for applying the train of pulses to be translated to the first input point, means for withdrawing the translated pulse train from the output point, a single-pulse-period-delay device connected to the second input point, and means for applying one of the pulse trains to this delay device. When the translation to be made is from reflected to conventional binary, the subject of the parent application, the pulses being arranged in order of decreasing digital significance, the train applied to the delay device is the output pulse train. When, as in the present application, the reverse translation is to be made, the pulse order being the same, the train applied to the delay device is the input train.

The translator thus carries out a series of comparisons. Its operation is simplest when the first pulse to arrive is the most significant one. When arranged for reflected-to-conventional translation, it compares each input pulse with the prior output pulse, signalling a "0" or Off pulse if they are alike and a "1" or On pulse if they are different. Proceeding from left to right in the foregoing table of five-digit binary numbers in the conventional and reflected codes shows that this is precisely the process by which any number of the second column may be converted into the same number in the third column. When arranged for conventional-to-reflected translation, the translator compares each input pulse with the preceding input pulse, signalling "0" pulse if they are alike and "1" pulse if they are different. Reference to the same table shows that this is precisely the process by which any number of the third column is converted into the same number in the second column.

If each individual pulse group of the incoming train, representing a single number and translated as described above, were separated from the preceding and following pulse groups by a guard interval of sufficient length, no more would be required for a complete translation of a sequence of such groups. In the case, however, of an incoming train that is unbroken by such guard spaces, the foregoing operations might make for interference between the last pulse of each group and the first pulse of the following group, and false translations would result. Accordingly, the invention provides for the breaking of such an unbroken pulse train into individual pulse groups. This is accomplished by momentarily halting the comparison effected by the disparity recognizer during the brief interval when the first pulse of each group makes its appearance. The comparison is halted by disestablishing the circuit path to one input point of the disparity recognizer or to the other input point, in dependence on whether the pulses of the incoming train arrive in order of decreasing digital significance or in the reverse order.

With such momentary disestablishment of one or other of these paths, the last pulse of each group of the outgoing train coincides in time with the arrival of the first pulse of the next group of the incoming train, and all interference between the last pulse of each group and the first pulse of the following group is prevented without the necessity of providing any guard interval between successive pulse groups.

With minor additions which are described in detail below, either of these translations can be made when the order in which the incoming pulses are arranged is reversed.

The apparatus of the invention is thus versatile and flexible. While the disparity recognizer itself may be of known construction, a number of preferred new disparity recognizer circuits are provided, any one of which may be employed in the translator of the invention.

The invention will be fully apprehended from the following detailed description of preferred embodiments thereof taken in connection with the appended drawings in which.

Figure 1:
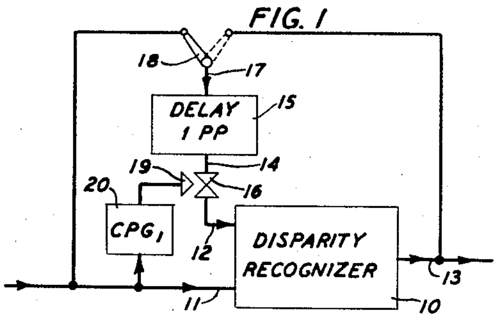
Fig. 1 shows a code translator adapted to receive incoming pulses in the order of decreasing digital significance and to deliver output pulses in the same order.

Referring now to the drawings, Fig. 1 shows a code translator according to the invention in elementary form. In this figure, the apparatus elements are interconnected by energy transmission paths represented by single lines. It will be understood that when such a translator is actualized, each such energy path will normally be replaced by a pair of conductors.

*Code translation of train of pulses arriving in order of decreasing digital significance—Conventional to reflected*

This operation is a part of the subject matter of the present divisional application.

The translator comprises a disparity recognizer 10 having two input terminals 11, 12 and an output terminal 13. The incoming code pulse group to be translated is applied to the first input terminal 11. One terminal 14 of a delay device 15, proportioned to introduce a delay of one pulse position or code element period, is connected by way of a normally closed switch 16 to the second input point 12 of the disparity recognizer 10. The input terminal 17 of the delay device 15 is connected to a manually operable switch 18 which may be thrown to the right as indicated by the broken line to establish a connection to the output terminal 13, or to the left as indicated by the solid line to establish connection to the second input terminal 12 of the disparity recognizer 10. The switch 16 which is connected in series between the output terminal of the delay device 15 and the second input terminal 12 of the disparity recognizer is normally closed, to be briefly opened by the application to its control terminal 19 of an auxiliary pulse derived from the incoming train by a control pulse generator 20 which delivers a control pulse upon the arrival of the most significant pulse of each pulse group of the incoming train. Its construction and significance will be described below and may be disregarded for the moment.

Consider now the operation of this translator circuit when a code pulse group in the conventional binary code is applied to its first input terminal 11, the most significant pulse arriving first. For translation from conventional code to reflected code the manual switch 18 is thrown to the left as shown, so that the disparity recognizer 10 compares each incoming pulse with the prior incoming pulse as delayed by the delay device 15 and so brought into time coincidence on the several input terminals 11, 12. Assume furthermore, that the code pulse group to be translated is the first one of a train so that, prior to its arrival, no energy is stored in the delay device 15. Taking the number "thirteen" as an example, the first conventional pulse to arrive is a "0." There being no stored energy in the delay device 15 the conditions on the two input terminals 11, 12 are alike and the disparity recognizer signals "0" as its output terminal 13. The second conventional pulse to arrive is a "1." It is compared with the previous "0." The recognizer recognizes the disparity and signals a "1." Similarly, the third pulse, a "1," is compared with the second, also a "1," and the disparity recognizer signals a "0." Next, the fourth pulse, a "0," is compared with the third pulse, a "1," and the disparity recognizer signals a "1." Lastly, the fifth pulse, a "1," is compared with the fourth pulse, a "0," and the disparity recognizer signals a "1."

The translation of the code group for the number "thirteen" from its form in the conventional binary code to its counterpart in the reflected binary code is now complete and, as will be noted from the foregoing table, it is correct. However, the last incoming pulse, a "1," is now stored in the delay device 15 to appear in a moment at the second input point 12. If steps were not taken to prevent it, the result would be to signal some value on the output terminal 13. To prevent this, the path from the delay device 15 to the second input point 12 is now disestablished by the opening of the switch 16 under control of the pulse generator 20. This action takes place synchronously with the arrival of the first and most significant pulse of the next incoming group to be translated, and endures for a single pulse period.

Provision having thus been made for disestablishing the path from the delay device 15 to the second input point 12 of the disparity recognizer 10 during the code element period immediately following the last input pulse, the apparatus is at once ready to translate the next code pulse group of the train without the necessity of providing any guard interval between consecutive code pulse groups.

*Code translation of train of pulses arriving in order of decreasing digital significance—reflected to conventional*

This operation is a part of the subject matter of the parent application.

To translate from the reflected binary code to the conventional binary code, it is only necessary to throw the switch 18 to the right, as indicated by the broken line, so that the delay device 15 is fed by output pulses as they appear on the terminal 13 instead of by input pulses. Taking the same example as before, the incoming reflected binary code pulse group to be translated is 01011. The first pulse to arrive is a "0." Since no energy is stored in the delay device 15 the conditions on the input terminals are alike and the recognizer 10 signals "0" at its output point 13. The second incoming pulse to arrive is a "1." This is compared with the previous output pulse "0." The conditions on the input points are different and the recognizer thus signals "1" at its output point. The third input pulse is a "0." This is compared with the second output pulse, namely, a "1," and the recognizer signals "1" at its output terminal. The fourth input pulse is a "1." It is compared with the third output pulse, a "1," and the recognizer signals no difference, or "0." The fifth input pulse is a "1." It is compared with the fourth output pulse, a "0," and the recognizer signals the disparity as a "1."

The translation is now complete and, as will be seen by referring to the foregoing table, it is correct. As before, to prevent false signaling by reason of the storage of the last output pulse of this group in the detail device 15, the path from the delay device to the second input point 12 is momentarily opened for the duration of a single code element by the application of a pulse from the control pulse generator 20 which occurs at the instant of arrival of the first and most significant pulse of the next incoming group. As before, no guard space need be provided and the apparatus is now ready to translate the following code pulse group whatever it may be.

The delay device 15 may be of any convenient variety, an electromagnetic delay line proportioned to introduce delay of precisely one pulse period being preferred.

*The disparity recognizer*

The disparity recognizer 10 may likewise take any one of a number of different forms, many of which are known in the art. Indeed, apparatus of this nature is so common that it has received a number of different appellations, namely, "re-entry adder," "half adder," "anti-coincidence circuit," "not and circuit," and "parity circuit." The term employed here, namely "disparity recognizer," is chosen for the reason that, as a matter of convenience and especially when delayed feedback is employed as described above, recognition of unlike conditions on the input terminals 11, 12 preferably takes the form of a pulse on the output terminal 13, while recognition of like input conditions preferably takes the form of no pulse on the output terminal 13.

Several suitable disparity circuits are shown in Carbrey Patent 2,571,680 where they are termed "re-entry adders." A combination of elements frequently employed for the purpose and usually designated as a "Not And" circuit is shown on page 271 of "High Speed Computing Devices" prepared by Engineering Associates and published by McGraw-Hill, 1950.

*Circuit details of disparity recognizers*

Figure 2:
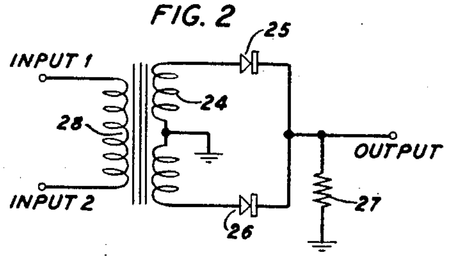
Fig. 2 is a schematic circuit diagram showing the structural details of a simple disparity recognizer for use in the combination of Fig. 1.

A particularly simple disparity recognizer is shown in Fig. 2. It comprises merely a transformer whose secondary winding 24 is connected by way of a center tap to ground, and rectifiers having their anodes connected to the end terminals of the secondary winding 24 and their cathodes connected together by way of an impedance element to ground. The ungrounded end of the impedance element is the output terminal and the two terminals of the primary winding 28 of the transformer constitute the input terminals. Its operation is as follows. When no pulses are applied to either input terminal, there is evidently no action and therefore no output pulse. When like pulses are applied to the two input terminals, they are similarly changed in potential and no current flows in the primary winding 28 so that no electromotive force is induced in the secondary winding 24, and again there is no pulse across the output impedance 27. When a pulse is applied to the upper terminal of the primary winding 28, an electromotive force is induced in the second winding 24 in one direction, for example, upward. The upper rectifier 25 then assumes its low resistance condition and current flows through it, through the load 27 to ground and back to the center tap of the secondary winding. A positive pulse therefore appears at the output terminal. When a pulse is applied only to the lower terminal of the primary winding 28, the electromotive force induced in the secondary winding 24 is in the opposite direction, the lower rectifier 26 assumes its low resistance condition and current flows through it and through the load resistor 27 to ground and back to the secondary winding center tap to produce a positive pulse at the output terminal. Thus the outlet pulse is of precisely the same character whether the single input pulse be applied to the upper terminal of the primary winding 28 or to the lower one.

Figure 3:
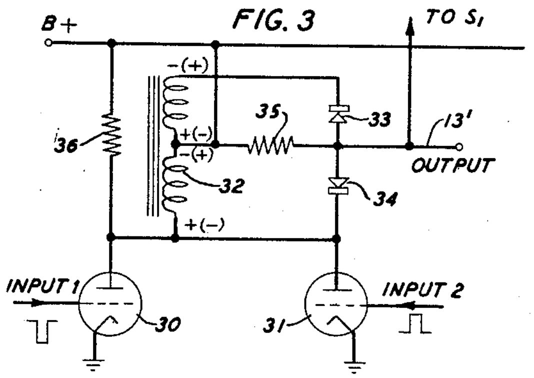
Fig. 3 is a schematic circuit diagram showing a variant of Fig. 2.
Figure 4:
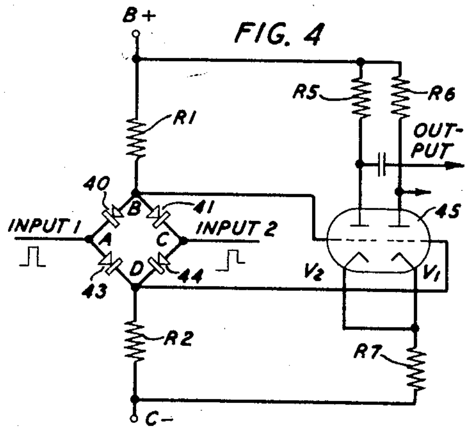
Figs. 4 and 5 are circuit diagrams of disparity recognizers alternative to those of Figs. 2 and 3.
Figures 5, 6, 7:
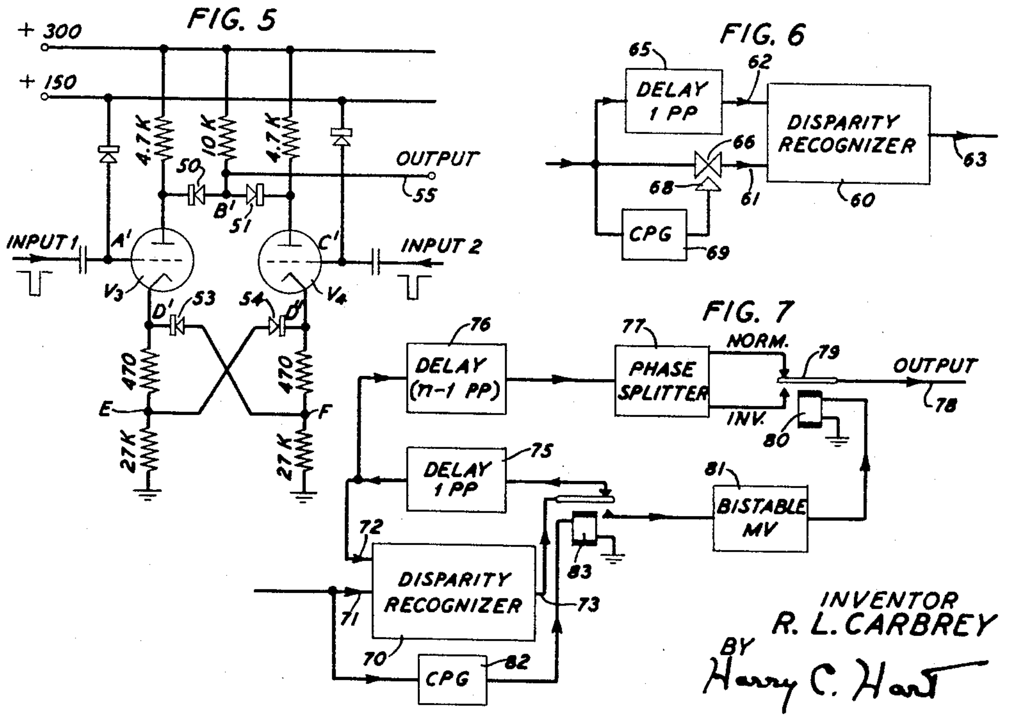
Fig. 6 is a schematic block diagram of apparatus for translating from conventional binary code to reflected binary code, incoming pulses arriving in the order of increasing digital significance.
Fig. 7 is a schematic block diagram showing a translator for carrying out the operation inverse to that of Fig. 6, the incoming pulses arriving in the same order.

Figs. 3, 4 and 5 show modified disparity recognizers which form part of the subject matter of the parent application. Of these, Fig. 3 shows a modification of the disparity recognizer of Fig. 2 in which the primary winding is dispensed with and replaced by two triodes 30, 31 whose anodes are connected together and to one terminal of an inductance coil. The two end terminals of this coil are connected by way of rectifiers 33, 34 connected back to back, to the output terminal 13 of the device, while the common point of these rectifiers is connected by way of a resistor 35 to a center tap of the coil 32. This center tap is also connected to a potential supply source indicated as B+ to which the triode anodes are connected by way of a resistor. This modification is especially suitable when the pulses to be applied to the two input points, namely the grids of the triodes, are of different signs. In particular, the grid of the left-hand tube 30 receives "1's" in the form of negative pulses while the grid of the right-hand tube 31 receives them as positive pulses. With this arrangement, if both input pulses are present, one being positive and the other negative, their effects cancel out by virtue of the connection together of the anodes of the triodes 30, 31. Obviously, if both inputs are zeros, there is no effect. However, if a pulse of appropriate polarity is applied to either of the two input points but not to the other, a positive electromotive force is developed across one half of the winding 32 and a negative one is developed across the other half of the winding. If the input pulses be interchanged as between the input points, the sole difference is the polarity of the electromotive force developed in the winding 32. Because the terminals of the winding are connected together by way of the oppositely poled rectifiers 33, 34, the result at the output terminal 13 is the same in the two cases.

Fig. 4 shows another disparity recognizer which employs a bridge rectifier. The first input is to corner junction A of the bridge and the second input is to corner junction C of the bridge. These inputs may most conveniently be supplied by way of vacuum tube amplifiers or cathode followers. The first and second rectifiers 40, 41 have their anodes connected together at junction B and to one terminal of a resistor $R_1$, the other terminal of this resistor being returned to a suitable source of positive voltage +B. These three elements together comprise what is now known as an "AND" gate. That is, junction B is permitted to go positive only if both corner A and corner C are driven positive by application of pulses to both input points, A and C. In the event that either or both of these is an Off pulse or "0," junction B is held at about the negative potential representing a "0" because the current through $R_1$ is flowing through one or both rectifiers in the low impedance forward direction.

The third and fourth rectifiers 43, 44 have their cathodes connected together at junction D and to one terminal of a resistor $R_2$, the other terminal of this resistor being returned to a suitable source of negative potential −C. These third and fourth rectifiers together with resistor $R_2$ comprise what is now known as an "OR" gate. That is, corner D is forcibly pulled positive whenever one or both inputs is in the positive or pulse condition. This occurs because the added current due to the positive voltage rise at the input corner A or C flows through the associated rectifier in the low impedance direction to corner D and then via the resistor $R_2$ to the negative supply terminal −C. Since the forward impedance of the rectifier 43 or 44 is small as compared with that of the resistor $R_2$, substantially all of the voltage drop due to this added current appears across the resistor $R_2$ in the form of a rise of potential at the corner D. If both inputs are positive On pulses, each of the rectifiers passes half of the current necessary to pull the corner D to the pulse-present condition.

From the foregoing, it is apparent that if both inputs are "0's" corners B and D will remain fixed and no output will be indicated. When there is a pulse present on either one of the input points but not on both, corner D rises and corner B remains fixed; so a potential difference is developed between them. The output could be taken from corner D except that this corner also rises when there are pulses present on both input points. Under this condition, however, corner B also rises, and no potential difference is developed between corners B and D.

This rise of potential at corner B, when both pulses are present, operates to prevent the pulse at the corner D from appearing at the final output terminal. This is accomplished in the circuit of Fig. 4 by the use of a difference amplifier 45. Triode $V_1$ of the difference amplifier has its grid connected to corner D and triode $V_2$ has its grid connected to corner B. In the inactivated condition, namely, that in which both inputs are "0's," the grid of $V_1$ is biased slightly positive with respect to the grid of $V_2$ due to the small voltage drops across the rectifiers 40—44. This causes the tubes $V_1$, $V_2$ to share the current flowing in their common cathode resistor $R_7$, most of it flowing through $V_1$. A similar condition prevails when both inputs are pulses because both grids are pulled positive. Only a small change appears at the two anodes because of the degenerating action of the cathode resistor $R_7$. When disparity is indicated, however, corner B remains fixed and holds the grid of $V_1$ at the normal space condition while corner D rises and draws with it the grid of $V_2$. The normal cathode follower action of $V_2$ drives the cathodes of both tubes positive. Thus tube $V_1$ becomes cut off and that current which was flowing through $V_1$ is transferred to $V_2$, thus maintaining the voltage drop across $R_7$ unchanged. The current transfer causes a positive pulse of voltage to be generated across the anode resistor $R_5$ of the tube $V_2$ and a negative pulse to be generated across the anode resistor $R_6$ of the tube $V_1$. The signal across $R_5$ can be utilized as the output and, when the code translation is from conventional binary code to reflected binary code, it may also be connected to the delay device 15 through the manual switch 18 (Fig. 1) to be fed back to input terminal 12 after a suitable change in direct current reference level, which can be provided by a battery, a conventional direct current restorer circuit, or the like. If preferred, the signal across $R_6$ can be utilized as the translated output.

Fig. 5 shows still another disparity recognizer. This circuit accepts input pulses of negative sign at the control grids of the two tubes $V_3$, $V_4$. With potential sources of the voltages indicated and resistors of the magnitudes indicated, these two grids are held to 150 volts positive when no input pulses are applied, in which case the cathode potentials stand at about 151 volts. The space currents in the two tubes are then almost identical in magnitude, even though the tubes be imperfectly matched. This is because a large amount of negative feedback is provided by way of the cathode resistors. These like currents produce equal voltage drops at the respective anodes of the tubes $V_3$, $V_4$ and the two upper diodes 50, 51 operate to hold junction point B′ at about the same voltage as the anodes. When like signals are applied to the two input points A′, C′, in the form of negative pulses applied to the two grids, the cathode potentials drop, and as a result the triode space currents both decrease; but due to the large amount of cathode feedback this decrease is only a few percent of the total space current. The junction point B′ then rises slightly due to this small variation, but this variation is in the opposite direction to the disparity pulse and if subsequently applied to the disparity recognizer it will be eliminated. For either of these two conditions the voltage developed across the 470 ohm cathode resistor, about 2.5 volts, is sufficient to bias the diode 53 or 54, connected from one of the cathodes to the tap on the opposite cathode resistor to its high back impedance condition. Thus, the cathodes are isolated one from the other and the two triodes $V_3$, $V_4$ act independently until this voltage is exceeded.

When a "0" is applied to one triode, for example, $V_3$, or a "1" to the triode $V_4$, the cathode of $V_3$ remains near its normal 151 volts, but the cathode of $V_4$ follows the applied pulse down to slightly below the voltage at the junction E. The reversal of voltage across the diode 54 connected from the junction E to the cathode of $V_4$ causes it to assume its low impedance condition; therefore, the cathode of $V_4$ is held at about 145 volts by the cathode of $V_3$ and the diode 54 while the grid of $V_4$ is driven at least 6 volts below this voltage. The tube $V_4$ is thus cut off. Its cathode current is transferred to $V_3$ which now draws nearly double normal current. As a result, a negative voltage pulse is developed at the plate of $V_3$ and the plate of $V_4$ rises to the voltage of the 300 volt battery. The diode 50 connected from $V_3$ to the junction B′ is in its low impedance condition; therefore this junction is pulled negative about as far as the plate of $V_3$ and a translated pulse is developed at the output terminal 55. The diode 51 which connects the junction B′ to the anode of $V_4$ is biased to its high impedance condition, thus isolating the anode of $V_4$ from the junction B′. If the "1" and "0" inputs are reversed, the current is transferred to triode $V_4$ and the junction B′ is drawn to a negative potential due to the doubling of the current in this triode, which current is divided between the 4700 ohm plate load resistor and the 10,000 ohm output resistor. One advantageous feature of this circuit is that the small unwanted pulse developed when both pulses were present during the preceding translation and other such low level crosstalk are not passed through the stage because the cathodes of $V_3$ and $V_4$ are decoupled until the two grids differ in potential by three or four volts.

It will be understood by those skilled in the art that transistors may be substituted for the vacuum tube triodes shown in Figs. 3, 4 and 5, provided appropriate modifications be made in the external circuits as required by the difference between the characteristics of the transistor and those of the vacuum tube.

*Translation from conventional to reflected binary code when pulses arrive in order of increasing digital significance*

This operation, which forms a part of the subject of the present divisional application, may be carried out by a modifications of the apparatus of Fig. 1 shown in Fig. 6, which serves to translate a number in the conventional binary code to its counterpart in the reflected binary code when the incoming pulses arrive in order of increasing significance—that is to say, the first pulse to arrive is the one which is of least significance in the code. It comprises a disparity recognizer 60 having two input points 61, 62 and an output point 63, a single pulse period delay device 65 being connected to the second input point 62 and this delay device being in turn fed from the incoming line as in the case of Fig. 1 when the manual switch 18 is thrown to its upward position. The path from the incoming line to the first input point 61 of the disparity recognizer 60 contains a switch 66 which is normally closed, to be opened for a single pulse period by a control signal applied to its control terminal 68 and delivered by the control pulse generator 69. The control pulse is to be applied at the instant at which the most significant pulse of the incoming train is being translated; in other words, at the instant at which the least significant pulse of the following pulse group of the incoming train would reach the first input point 61 of the disparity recognizer were it not that the path is then opened.

The operation of the system will be explained in connection with the translation of the number "thirteen" as before. This operation is as follows.

The first pulse to arrive is a "1." At this instant the path to the input point 61 is opened so that no pulse reaches the first input point. This pulse, however, is stored in the delay device 65 for use in connection with the ensuing comparison. The next pulse to arrive is a "0." The path to the first input point 61 is now established and, a single pulse period having elapsed, the first pulse reaches the second input point 62. The conditions on the input terminals 61, 62 are different and the disparity recognizer signals a "1" at its output terminal 63. Similarly, the third input pulse, a "1," is compared with the second, a "0," to give a "1" output; the fourth input pulse, a "1," is compared with the third, a "1," to give a "0" output; and the fifth input pulse, a "0," is compared with the fourth, a "1," to give a "1" output. The path to the first input point 61 is now opened by the control signal applied to the switch 66 to give a "0" on the first input point while the fifth input pulse, a "0," has now passed through the delay device and is applied as a "0" to the second input point. The conditions are alike and the apparatus signals the parity as a "0" on its output terminal 63.

The translation is now complete and, as will be seen by referring to the foregoing tabulation, it has been carried out correctly.

*Translation from reflected to conventional binary code when pulses arrive in order of increasing digital significance*

This operation forms part of the subject matter of the parent application.

Fig. 7 is an energy path diagram of apparatus for carrying out the fourth kind of translation, namely from reflected binary code to conventional binary code, the incoming pulses arriving in order of increasing significance; that is the least significant pulse arrives first. It is necessarily a more complicated system than those of Fig. 1 and Fig. 6, the reasons wherefor will appear more fully below. A disparity recognizer 70 is provided having two input points 71, 72 and an output point 73. As in the case of Fig. 1 with the manual switch 18 in its down position, a feedback path is provided from the output point 73 to the second input point 72 which contains a delay device 75 proportioned to introduce a delay of a single pulse period. In addition, however, the following further elements are provided. A second delay device 76, proportioned to introduce a time delay of $n-1$ code elements, where $n$ is the number of digits employed in each code group, is connected to the output terminal of the first delay device 75, and this in turn feeds a phase splitter 77 having two output terminals, on one of which the input to it is reproduced without change while the input to the phase splitter is reproduced with inversion of phase on the other. The output terminal 78 of the apparatus as a whole is connected to an armature 79 which makes contact with one or other of the output terminals of the phase splitter 77 under control of a signal derived from a bistable multivibrator 81. A path is provided from the first input point 71 of the disparity recognizer 70 to an auxiliary control pulse generator 82 which may contain a multivibrator as before. This pulse generator delivers an output pulse once for each code pulse group and at the instant at which the translation of the most significant digit of each group appears on the output terminal 73 of the disparity recognizer 70. This control signal acts by way of a relay 83 to disestablish the feedback path momentarily and at the same time to establish a path from the output terminal 73 of the disparity recognizer 70 to the double stability multivibrator 81.

The operation of this apparatus will be understood by way of the same example as before in which, now, translation is from the third column of the foregoing tabulation to the second and proceeds, digit by digit, from right to left.

Since the comparison takes place between each input pulse and a delayed output pulse, no such comparison can be made until the first input pulse shall have traveled around the feedback loop and the second is being applied to the first input terminal. But this comparison is the one which is employed in the second translation operation. Therefore, the first translated pulse must be arbitrarily assumed of one kind or the other, the assumption to be corrected as necessary on the basis of information later to be obtained.

Following this plan, before the first input pulse, a "1," arrives at the first input terminal 71 of the disparity recognizer 70 the feedback path is opened by the relay 83. Therefore, a "0" is applied to the delay device 75. After a delay of $n$ pulse elements this "0" appears at the output terminal of the second delay device 76 and, provided the switch 79 connects the output terminal 78 to the normal phase output of the phase splitter 77, it is employed to represent the first output digit. Let it be assumed that it is so signaled on the output terminal 78 of the apparatus as a whole.

The feedback path is now reestablished so that comparisons may be made between each input pulse and the preceding output pulse. But in this connection the output pulse precedes the input pulse in time though not in digital significance. Therefore, using the terms "first," "second," "third," etc., in the order of pulse significance, the first comparison takes place between the first arbitrary "0" output pulse and the first input pulse, a "1." The disparity is signalled as a "1," the second output pulse. This, in turn, is compared with the second input pulse, a "1." The parity is signalled as a "0," the third output pulse. This, in turn, is compared with the third input pulse, a "0." The parity is signalled as a "0," the fourth output pulse. This, in turn, is compared with the fourth input pulse, a "1." The disparity is signalled as a "1," the fifth output pulse. This, in turn, is compared with the fifth input pulse, a "0." The disparity is signalled as a "1." This sixth and last pulse is not employed as part of the translated output, but is employed rather to correct the initial assumption. Its occurrence takes place at the same time as the last input pulse of the group. Meanwhile, the fifth incoming digit pulse, whatever its character, has operated the relay 83 to disestablish the feedback path and connect the output of the disparity recognizer 70 to the input of the bistable multivibrator 81 allowing the sixth output pulse to trip it. An output pulse is thus delivered to the relay 80 which throws the switch 79 to the phase-inversion terminal of the phase splitter 77, thus reversing the polarity of all the pulses to date stored in the two delay devices 75, 76 together and so converting each "0" to a "1" and each "1" to a "0." From the foregoing description, it will have been noted that the pulses accumulated in the two delay devices together are "0," "1," "0," "0," "1," in the order in which they are applied to the input terminal of the phase splitter 77. (The corrector pulse has not been stored in the delay device.) The phase inversion operation thus changes the first five pulses of this train to "1," "0," "1," "1," "0," and this sequence will be recognized from the foregoing table to be the correct translated output stated in the order in which the pulses reach the output terminal 78. Rewriting this pulse sequence in the order of decreasing digital significance from left to right as in the second column of the table, we have, at last, 01101, which is identical with the entry of the table opposite the number "thirteen."

Had the most significant digit turned out to be a "0," instead of a "1," the bistable multivibrator 81 would have remained in or would have been triggered to the condition in which the output terminal of the apparatus would be connected to the normal phase output of the phase splitter 77 and the inversion operation would not have taken place. It may easily be determined by following through the operations in connection with another number that the result is in all cases correct.

Each of the auxiliary circuits employed in the combinations of Figs. 1, 6 and 7 to open the various switches is required merely to deliver an output pulse of the proper duration and occurring at the proper time. The duration of this output is in each case one pulse period. The time at which it occurs differs from one system to the other in the manner described above in connection with Figs. 1, 6, and 7. This instant of occurrence can easily be set with precision on the basis of a synchronizing or framing pulse which is normally included in suitable form in every incoming pulse train. Many systems are available for including such a synchronizing or framing pulse and for recognizing it and turning it to account at a receiver station. Apparatus of this character is shown, for example, in Peterson Patents 2,527,649, 2,527,650 and 2,546,316. The framing or synchronizing pulse, once it has been sorted out from the information-carrying pulses of the train, may be applied in well-known fashion to control the trimming of a multivibrator at the proper instant while the circuit elements of the multivibrator are themselves proportioned to deliver, each time it is tripped, a pulse of one pulse period duration. The latter may be brought into coincidence with the desired information-carrying pulse of the train in well-known fashion as, for example, by the employment of a delay device such as an electromagnetic delay line of appropriate length. The latter may be connected ahead of the multivibrator or following it as dictated by circumstances.

What is claimed is:

1. In combination with a source of an unbroken train of incoming 2-valued digit pulses representing a sequence of numbers in the conventional binary permutation code, the digits present in said numbers being represented by pulses of one of said two values and the digits absent from said numbers being represented by pulses of the other of said two values, means for grouping the pulses of said train into successive groups, each group comprising $n$ consecutive 2-valued pulses and representing a single one of said numbers in said code, means for translating each of said successive pulse groups into a different outgoing group of $n$ 2-valued pulses arranged to represent said number in the reflected binary permutation code, which translating means comprises means for comparing the values of two consecutive digit pulses of one of said successive groups, means for generating an outgoing digit pulse of one value when said compared digit pulse values are alike and of the other value when said compared digit pulse values are unlike, and means for repeating said comparison and digit pulse generation for each of the several consecutive digit pulses of each incoming pulse group.

2. Apparatus as defined in claim 1 wherein said grouping means comprises means for inhibiting the operation of said pulse value comparing means on the arrival at said comparing means of the first pulse of each incoming group.

3. Apparatus as defined in claim 1 wherein said comparing means comprises disparity recognizing means having two input points and an output point for generating at its output point a pulse of one value on the concurrent application of pulses of like values to its input points and a pulse of the other value on the application of unlike pulses to its input points, a single pulse period delay device interposed in series between said first input point and said second input point, means for consecutively applying all the pulses of each incoming group to said first input point, and means for withdrawing a translated pulse train from said output point.

4. Apparatus as defined in claim 3 wherein said grouping means comprises a normally closed switch having a first conduction terminal connected to said pulse train source, a second conduction terminal connected to one input point of said disparity recognizing means and a control terminal, means for generating a control pulse of a single pulse period duration and coincident in time with the application to said first input point of the first pulse of each incoming code pulse group, and means for applying said generated pulse to said control terminal, thereby to prevent the application of said first pulse to that input point of the disparity recognizing means to which the second conduction terminal of said switch is connected.

5. Apparatus as defined in claim 4 wherein the second conduction terminal of said switch is connected to the second input point of said disparity recognizing means.

6. Apparatus as defined in claim 4 wherein the second conduction terminal of said switch is connected to the first input point of said disparity recognizing means.

References Cited in the file of this patent

UNITED STATES PATENTS

| | | |
|---|---|---|
| 2,530,957 | Gilman | Nov. 21, 1950 |
| 2,568,319 | Christensen | Sept. 18, 1951 |
| 2,570,236 | Hoeppner | Oct. 9, 1951 |
| 2,679,644 | Lippel | May 25, 1954 |
| 2,686,632 | Wilkson | Aug. 17, 1954 |
| 2,762,564 | Samson | Sept. 11, 1956 |